April 21, 1953 P. E. PONTICELLO 2,635,883

SOUND REPRODUCING DEVICE

Filed Oct. 31, 1951 2 SHEETS--SHEET 1

Philip E. Ponticello

INVENTOR.

BY Clarence A. O'Brien and Harvey B. Jacobson

Attorneys

Philip E. Ponticello
INVENTOR.

BY Clarence A. O'Brien
and Harvey B. Jacobson
Attorneys

Patented Apr. 21, 1953 2,635,883

UNITED STATES PATENT OFFICE 2,635,883

SOUND REPRODUCING DEVICE

Philip E. Ponticello, Nutley, N. J.

Application October 31, 1951, Serial No. 254,050

2 Claims. (Cl. 274—1)

This invention relates to sound reproducing devices and more particularly to toy phonographs and to other phonographs with a much simplified structure and it has for its object to provide a simple and sturdy assembly which occupies little space so that it may be housed within a small and flat box which when closed also forms a locking mechanism for a spring motor which drives the phonograph.

It is a further object of the invention to provide a sound reproducing device of the above named type which can be manufactured with very little expense so that it may be used either as a toy or in the manner of a greeting card delivering a spoken message or as a complementary addition to other goods sold or for similar purposes.

In order to be able to fulfil the above purpose of being used as a birthday greeting card delivering a message upon opening of the box the phonograph according to the invention is enclosed within a small light-weight box of little depth provided with a fixed record which delivers the desired message preferably from a record made by the person mailing the device. Therefore the sound reproducing device must be of such a type that it is also capable of recording the message on the record which is fixedly or removably attached.

According to the invention a phonograph of this type comprises a spring motor driving a turntable shaft which is provided with a collar to which the record may be fixedly or removably attached, preferably by an adhesive if a fixed attachment is selected, and the motor simultaneously also drives a sound box carrying a tone arm at a selected slow speed so that it swings slowly around a shaft driven by the spring motor. This movement will permit the tone arm to move inwardly on the record when the record is made. During such movement a vertical swing motion of the tone arm is obtained by means of a guide attached to the tone arm sliding on a guide plate which lowers the tone arm so that the needle may be pressed against the record plate permitting the tone arm to be held in this position and after termination of the record lifts the tone arm again so as to remove the needle from the record plate.

Further according to the invention the swinging tone arm is connected with a diaphragm mounted in the sound box which swings with the tone arm and which is so located and arranged that it may pick up sound oscillations and transmit them to the tone arm and that it is likewise capable of reproducing oscillations which have been transmitted by the tone arm.

Further according to the invention the sound reproducing or producing device is driven by a spring motor which may be wound up by conventional means from the outside but which is held in a locked position by a coupling attached to a shaft driven by the spring motor by its engagement with a fixed coupling member attached to the lid of the box and engaging the said coupling so as to hold the spring motor driven shaft when the lid is closed.

According to the invention, therefore, the tone arm, while the record disk and record driving shaft rotate and perform a number of revolutions, corresponding to the number of spiral grooves which may be cut into a disk of the selected size, performs a double swinging movement in two planes at right angles to each other. One swinging movement is performed in a plane parallel to the record disk and is imparted to the tone arm by the sound box. It moves the needle carrying end of the tone arm inwardly in a radial direction, stopping when the last groove has been reached. The other swinging movement is produced by the guide and the guide plate and starts from a position in which the needle carrying end of the tone arm is lifted and produces a downward movement permitting the needle to be resiliently pressed against the record when the tone arm is above the outermost groove of the record and lifts the tone arm again and maintains it in a lifted position when the innermost groove has been reached and the first named swinging movement of the tone arm stops.

Further features of the invention and further and more specific objects will be apparent from the following detailed specification.

The invention is described with reference to the accompanying drawings illustrating one modification thereof by way of example. It is however to be understood that the example shown has been selected in order to explain the principle of the invention and the best mode of applying said principle. The embodiment of the invention illustrated in the drawings is not the sole construction embodying the principle of the invention and a departure from the embodiment which has been illustrated is therefore not necessarily a departure from the essence of the invention.

Figures 1, 2, 7, 8, 9:
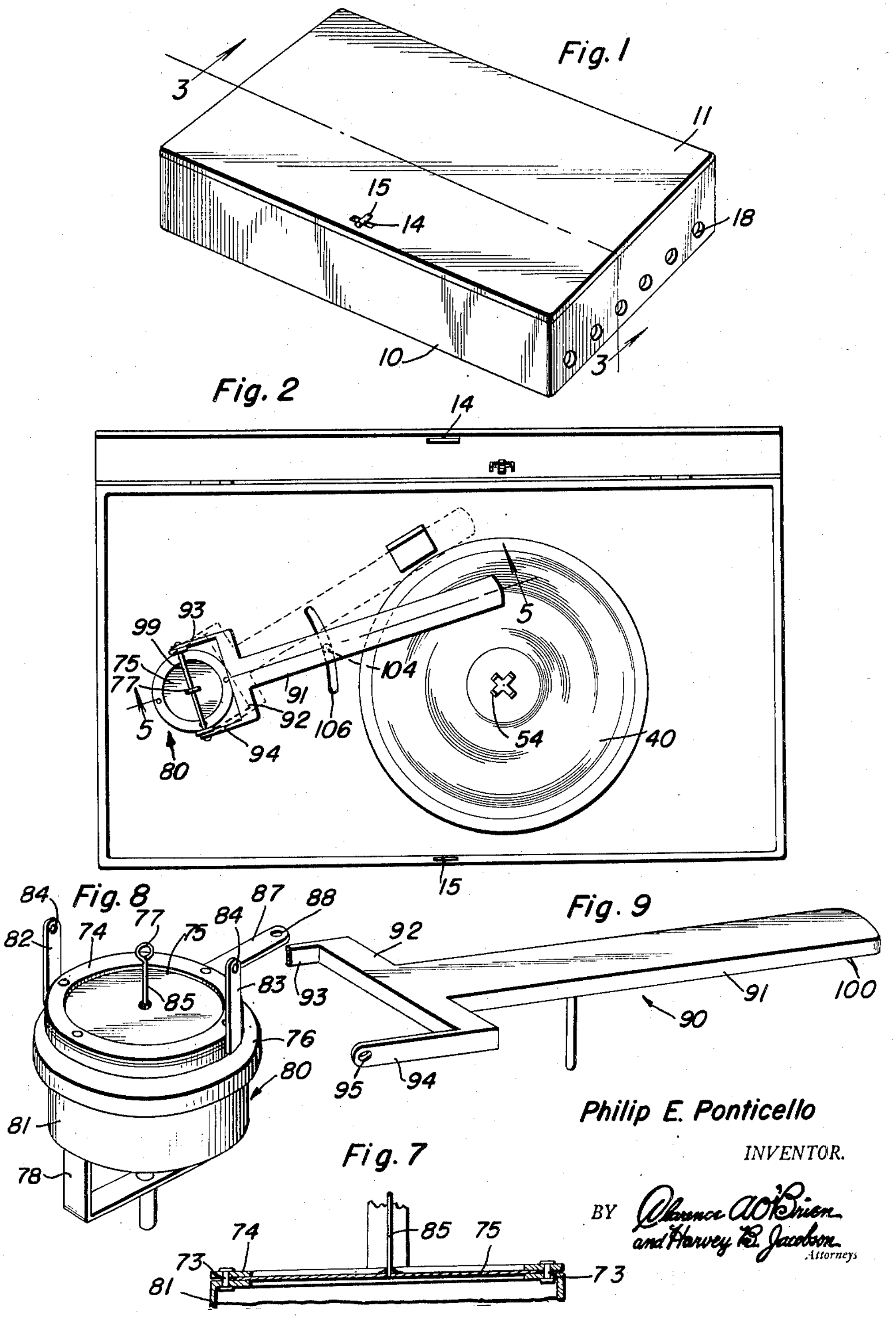
Figure 1 is a perspective view of the box containing the sound reproducing device when closed.
Figure 2 is a plan view of the sound reproducing device, the lid of the box containing said device being open.
Figure 7 is an enlarged sectional elevational view of the upper part of the sound box and of the diaphragm.
Figure 8 is a perspective view of the sound box.
Figure 9 is a perspective view of the tone arm.

The phonograph according to the invention is shown in the form in which it may be used as a greeting card so that it can be mailed at little cost in order to transmit a spoken message from one person to another on special occasions such as birthdays, holidays or the like.

The phonograph comprises a completely closable flat box 10 preferably made of one of the so-called plastics, the box being closable by means of a lid 11 hinged or otherwise fixed to the box 10. The lid may be held in its closed position by means of a slot 14 and by means of a member, such as a lock screw or a flexible tongue or the like held in the plastic and projecting through the slot which may be turned or twisted around in order to firmly hold the lid of the box.

The box is provided with sound openings 18 and also with a further opening 19 (Figure 3) arranged in the bottom of the box in the modification illustrated through which the spring motor 20 (Figures 3 and 4) may be wound up.

Within the box a horizontal partition 21 preferably dividing the box completely is arranged which may also be made of plastics and which subdivides the box in such a way that above the partition the upper part of the sound box, the tone arm and the record are arranged while the other members are located below the partition and are therefore not visible.

Within the lower compartment 17 formed by the partition 21 within the box 10 a small flat frame 32, acting as a supporting and journaling means for various parts to be described and housing the spring motor and its gearing is held by appropriate means such as, for instance, pins, screws or by an adhesive. Also this frame may be made of plastic. Within this frame the spring motor 20 is held.

Figure 3:
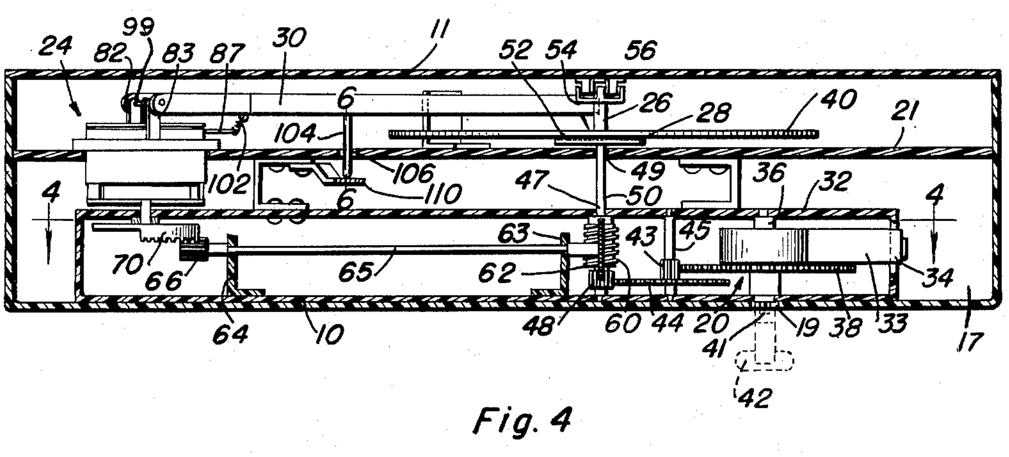
Figure 3 is an elevational sectional view of the device according to the invention, the section being taken along line 3—3 of Figure 1.
Figure 4:
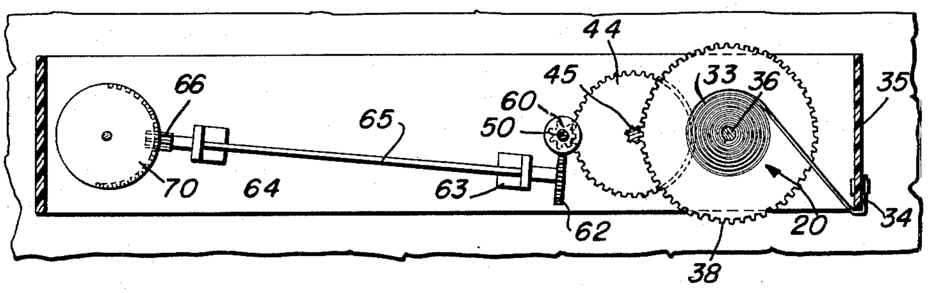
Figure 4 is a sectional plan view through the device, the section being taken along line 4—4 of Figure 3.

The spring motor 20 is conventional construction and merely comprises a coil spring 33 the end 34 of which is fixed in the end wall 35 of the frame 32. The spring is coiled around a shaft 36 carrying a gear wheel 38. The shaft 36 is suitably stepped and is held and journaled within small openings in the frame 32. The frame may be of a resilient material to allow introduction of the shaft into the journaling openings. One end of the shaft 36 is provided with a square pin 41 projecting into the hole 19 in the bottom of the box 10. A key 42, indicated in dotted lines in Figure 3, is provided and is a detachable element which may be inserted into the hole and engage the projecting square pin of the shaft 36 in order to wind the coil spring 33.

A gear shaft 45 carrying pinions 43, 44 is arranged near the coil spring motor in order to produce the proper gear ratio between the turntable shaft 50 operated by the spring motor and the motor shaft 36. The smaller pinion 43 meshes with gear wheel 38 on the shaft 36. The larger pinion or gear wheel 44 meshes with pinion 48 on the turntable shaft 50. The latter projects through an opening 47 in the frame 32 in which it is journaled and through a further opening 49 in the partition wall 21 into the upper compartment and it carries a collar 52 and projects upwardly from said collar towards the lid of the box. The collar 52 carries a record which for many purposes may be fixedly mounted in the device for instance by gluing the record to the collar.

At the upwardly projecting end of the shaft 50 a clutch member 54 may be mounted which may be fixed or removable. The clutch member 54 engages a second clutch member 56 mounted on the interior of the lid 11 and this latter clutch member 56 clearly can only engage the member 54 if the lid is closed. Whenever the lid is opened the two clutch members are disengaged and a free rotation of the shaft 50 is permitted, so that the clutch functions as a locking means for the spring motor 20 holding the parts while the coil spring is wound and releasing the parts when the lid is opened so that the sound reproduction and the delivery of the message starts with the opening of the lid when the coil spring motor has been wound up. Therefore, upon opening of the lid of the box the phonograph starts to play automatically provided that the spring motor has been wound.

The shaft 50 driving the record carries moreover a worm 60 engaging a worm wheel 62 which is mounted on a substantially horizontal shaft 65. The shaft 65 is held in small brackets 63, 64 mounted on the frame 32 which shaft carries at its end a pinion 66. The pinion meshes with a mutilated crown wheel 70 provided with crown teeth arranged along a segment only of the periphery. The mutilated crown wheel is carried by a shaft 72 which is connected with the sound box in a manner to be described.

It will be understood that when crown wheel 70 is driven the sound box and with it the tone arm is moved automatically as long as the teeth of the crown wheel engage the teeth of the pinion 66. When the crown wheel has been moved beyond the segment carrying teeth the shaft 72 comes to a stop. The sound box can thus only be moved through a predetermined and limited angle.

The sound producing unit consists of a sound tube or box 80 which is preferably a cylindrical tube 81 of suitable diameter the end face of which is provided with holes 73 for holding suitable fixation means for the diaphragm and an annular washer or ring 74 which clamps the marginal portion of the diaphragm 75 on the rim. The sound box is closed at its lower end and at its upper end carries the diaphragm 75 which closes the upper end of the tube. The sound box 80 is moreover provided on the outside with a collar 76 which protrudes from the tube and which serves as a support for the tube on the partition 21 through which the lower portion of the sound box projects.

The tube is provided with two brackets projecting from its upper half and with the bracket 78 in the shape of a bail or box mounted at its lower end. The bracket 78 which may be bail shaped is fixedly connected with the shaft 72 so that when the said shaft is rotated both the bracket and the sound box are swung around through the arc through which the crown wheel may be moved.

Of the three brackets carried on the sound box in its upper half two brackets 82, 83 are vertically projecting standing posts or ears each provided with a hole 84 near its end. These holes 84 are aligned with an eye 77 in a diaphragm needle 85 which projects from the center of the diaphragm in a vertical direction and which is therefore parallel to the brackets 82 and 83. The third bracket projecting from the upper half of the tube is a horizontal arm 87 which is also provided at its end with a hole 88 for a purpose which will be stated below.

Figures 5, 6:
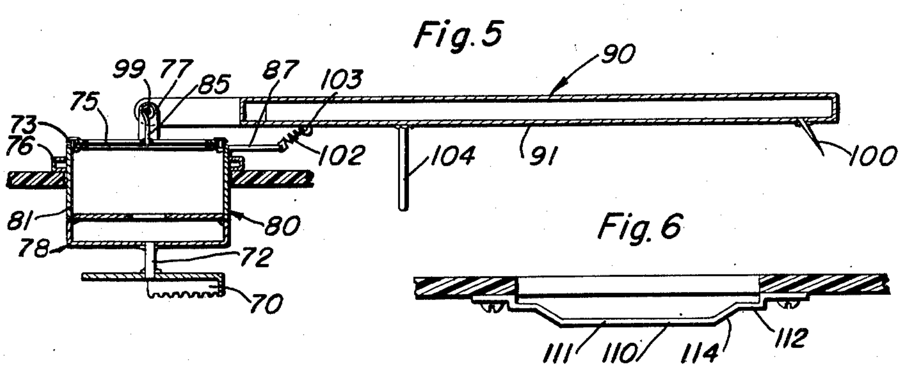
Figure 5 is an elevational sectional view of the tone arm and the sound box with attached parts, the section being taken along line 5—5 in Figure 2.
Figure 6 is a sectional view of a detail, the section being taken along line 6—6 of Figure 3.
Figure 10:
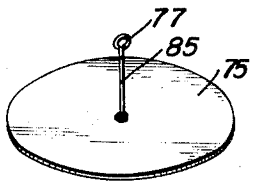
Figure 10 is a perspective view of the diaphragm.

The tone arm 90 (Figure 5 and Figure 9) is a small elongated box structure made of sheet metal with a longitudinally extending needle carrying arm 91 and with a transverse arm or member 92 at one end, the needle 100 being carried on the other end and preferably fixed to the underside of the tone arm. The needle is preferably fixed in an inclined position on the tone arm in order to better ride the sound track of the record on which it rests. The transverse end 92 of the tone arm is provided with two projecting prongs 93, 94 having bores or holes 95 near their ends. The prongs are so spaced that they fit over the projecting standing posts 82 and 83 permitting an alignment of the holes 95 with the holes 84 of the two standing posts 82 and 83. As already above stated the eye 77 of the diaphragm needle is also aligned with the said bores or holes 85 and 84. Through the aligned openings or holes and through the eye of the diaphragm needle 85 the wire 99 is passed connecting the tone arm with the diaphragm and also permitting the tone arm to move upwardly and downwardly around a pivot which is formed by the said wire 99.

The tone arm is pulled downwardly by means of a small spring 102 one end of which is attached to an eye 103 in the tone arm while the other end of the spring is hooked into the hole or eye 88 of the horizontal bracket 87 of the sound box. It will thus be seen that the spring 102 produces a certain pressure between the needle 100 and the record provided that the tone arm rests on the record disk.

The tone arm moreover carries a supporting or guiding pin 104 which controls the position of the tone arm relatively to the record. This pin 104 projects through a slot 106 in the partition 21 and rests on a guide plate 110 which is either fixed on the partition wall or which projects from the bracket supporting said wall. The slot 106 is preferably arcuate as shown or is of such width that arcuate movement of the guide pin is possible. Moreover the guide plate 110 is stepped and has a central depressed portion 111 and laterally raised portions 112 joined by inclined stepped portions 114. Therefore, when the pin 104 moves transversely along the slot 106 it is first held on the raised portion in which the needle is lifted out of contact with the record and when the guide pin slides along the step it is lowered so that the needle is set on the record and it is kept there with a certain amount of pressure due to the action of the spring 102. The needle will now ride the sound track or cut a sound track into the rotating record the tone arm being moved inwardly by the crown gear. When the needle has arrived at the termination of the record the guide pin 104 will also have arrived at the step 114 the tone arm will again be raised by the stepped portion and by the higher portion 112 of the guide plate thus lifting the needle from the record whereupon the tone arm comes to rest in a raised position as soon as the mutilated crown wheel disengages itself from pinion 66. The operator may, of course, lift the tone arm, rewind the spring motor, and reproduce the record again.

The operation of the device will be understood from the above description.

If the device serves as a greeting card with a spoken message and the record has first to be cut, this is done by means of the tone arm which is brought into one of its end positions the motor being wound in order to operate the record carrier. When the needle after a short time starts to cut the record the operator speaks and delivers his message which will be received on the diaphragm the oscillation of which operates the tone arm and thus producing the sound track. During this operation the spring motor rotates the sound track by means of the gear wheels and at the same time also swings the tone arm inwardly so that a spiral groove results. The inward swinging is produced by the horizontal shaft 65 driven by the worm wheel 62 which is operated by the worm on the turntable shaft 50. As long as the pinion 66 meshes with the teeth of the crown wheel the tone arm will slowly turn around and when finally reaching the step 114 will be lifted, while at the same time the teeth of the crown wheel 70 do no longer engage the pinion 66 as the crown wheel has been turned around to its fullest possible extent. In this position the operator closes the lid thus arresting the shaft 50 in its position. Before doing so he may put the tone arm back to its original position to facilitate operation by the person receiving the message. The person receiving the message has only to wind the spring motor provided this winding has not been performed already by the sender and to open the lid whereupon the reproduction of the sound immediately starts as the tone arm will oscillate, the guide pin 106 being its fulcrum and thereby produce an oscillation of the diaphragm 75 which in its turn transmits the oscillation to air and converts them into sound waves. In all other respects the operation of the device during the reproduction of the sound recorded on the record is identical with the operation during the cutting of the record.

It will be clear that the device may undergo certain changes with the purpose for which it is used. It may, for instance, be advisable to use a record which can be played on both sides and in this case the coupling member 54 has to be mounted in a removable manner. Other applications may require other changes. However, changes of an unessential nature, as will be understood, will not in any way affect the essence of the invention defined in the annexed claims.

Having described the invention, what is claimed as new is:

1. A portable and mailable sound reproducing device having the shape of a flat box and adapted to make a record on and to reproduce said record from the same single record disk, comprising a flat casing provided with a lid and with a partition which is parallel to the bottom and to the lid of the casing, said partition dividing the box into an open compartment closed by the lid and a permanently closed compartment containing the driving mechanism and being provided with a circular opening and with an arcuate slot, a rotatable circular sound box provided with a projecting collar near its upper end inserted into the circular opening and rotatably held therein, said sound box being provided on its upper side with a diaphragm and with upstanding ears, the lower portion of the sound box being located in the closed compartment and being provided with a central axle fixedly attached to the sound box and carrying a mutilated crown wheel, a spring motor in said closed compartment provided with a winding mechanism including a key engaging means accessible through an opening in the bottom of the casing, a drive shaft provided with means for holding the record, a further shaft connecting said drive shaft with the sound box driving means, arranged in said lower compartment, means on said drive shaft for driving said further shaft, a toothed wheel on said further shaft engaging said mutilated crown wheel, for producing a limited angular movement of the sound box in one direction, a tone arm with a forked portion in the upper compartment, said forked portion being provided with prongs held in the ears of the sound box, a needle engaging the record and a supporting rod on said tone arm passing through the arcuate slot of the partition, a guide below the arcuate slot in the lower compartment for supporting the tone arm at heights at which the needle is out of engagement with the record upon the starting of the motor, then comes into engagement with the record and finally is again lifted from engagement with the record, and a connection between the diaphragm and the end of the tone arm held on the sound box.

2. A portable and mailable sound reproducing device having the shape of a flat box and adapted to make a record on and to reproduce said record from the same single record disk, comprising a flat casing provided with a lid and with a partition which is parallel to the bottom and to the lid of the casing, said partition dividing the box into an open compartment closed by the lid and a permanently closed compartment containing the driving mechanism and being provided with a circular opening and with an arcuate slot, a rotatable circular sound box provided with a projecting collar near its upper end inserted into the circular opening and rotatably held therein, said sound box being provided on its upper side with a diaphragm and with upstanding ears, the lower portion of the sound box being located in the closed compartment and being provided with a central axle fixedly attached to the sound box and carrying a mutilated crown wheel, a spring motor in said closed compartment provided with a winding mechanism including a key engaging means accessible through an opening in the bottom of the casing, a drive shaft provided with means for holding the record, in positive connection with a spring motor, having an extension above the record, a locking means for the drive shaft and spring motor at the end of the drive shaft, engaging a corresponding locking means on the lid, the two locking means engaging and locking the drive shaft and spring motor when the lid is closed, automatically releasing the drive shaft and spring motor when the lid is opened, a further shaft connecting said drive shaft with the sound box driving means arranged in said lower compartment, means for driving said further shaft, a toothed wheel on said further shaft engaging said mutilated crown wheel, for producing a limited angular movement of the sound box in one direction, a tone arm with a forked portion in the upper compartment, said forked portion being provided with prongs held in the ears of the sound box, a needle engaging the record and a supporting rod on said tone arm passing through the arcuate slot of the partition, a guide below the arcuate slot in the lower compartment for supporting said tone arm supporting rod and tone arm at heights at which the needle is first out of engagement with the record, then comes into contact with the record and finally again is lifted from engagement with the record, and a connection between the diaphragm and the end of the tone arm on the sound box, said tone arm thus being normally held out of engagement with the record when the lid is closed, but upon opening of the lid starting to move the needle downward towards the record and to play and reproduce the record while being lifted again into inoperative position after the playing of the record.

PHILIP E. PONTICELLO.

References Cited in the file of this patent

UNITED STATES PATENTS

| Number | Name | Date |
|---|---|---|
| 1,604,952 | Altmann | Nov. 2, 1926 |
| 1,809,669 | Borromeo | June 9, 1931 |
| 2,032,062 | Lichten | Feb. 25, 1936 |
| 2,523,340 | Bonsall | Sept. 26, 1950 |